(12) United States Patent
Beck

(10) Patent No.: US 7,127,551 B2
(45) Date of Patent: Oct. 24, 2006

(54) FLASH MEMORY MANAGEMENT METHOD

(75) Inventor: Chang-kyu Beck, Seoul (KR)

(73) Assignee: Samsung Electronics Co., Ltd., Kynjki-do (KR)

( * ) Notice: Subject to any disclaimer, the term of this patent is extended or adjusted under 35 U.S.C. 154(b) by 341 days.

(21) Appl. No.: 10/294,906

(22) Filed: Nov. 15, 2002

(65) Prior Publication Data

US 2003/0101327 A1    May 29, 2003

(30) Foreign Application Priority Data

Nov. 16, 2001    (KR) .............................. 2001-71401

(51) Int. Cl.
*G06F 12/00* (2006.01)
(52) U.S. Cl. ................. 711/103; 365/185.01
(58) Field of Classification Search ................ 711/103, 711/151, 159, 163, 206; 714/5–8, 17, 22, 714/710; 365/185.02, 185.03, 185.04, 185.11, 365/185.33, 218
See application file for complete search history.

(56) References Cited

U.S. PATENT DOCUMENTS

| | | | | |
|---|---|---|---|---|
| 5,682,497 A | * | 10/1997 | Robinson | 711/103 |
| 5,740,396 A | * | 4/1998 | Mason | 711/103 |
| 5,812,814 A | * | 9/1998 | Sukegawa | 711/103 |
| 5,838,614 A | * | 11/1998 | Estakhri et al. | 365/185.11 |
| 5,905,993 A | * | 5/1999 | Shinohara | 711/103 |
| 5,933,847 A | * | 8/1999 | Ogawa | 711/103 |
| 5,963,474 A | * | 10/1999 | Uno et al. | 365/185.04 |
| 6,763,424 B1 | * | 7/2004 | Conley | 711/103 |

FOREIGN PATENT DOCUMENTS

| | | |
|---|---|---|
| JP | 06-004228 A | 1/1994 |
| JP | 10-124384 A | 5/1998 |
| JP | 11-110300 A | 2/1999 |
| JP | 11-110283 A | 4/1999 |
| JP | 2000-20391 A | 1/2000 |
| KR | 2000-0039727 A | 7/2000 |
| KR | 2001-0029171 A | 4/2001 |

OTHER PUBLICATIONS

Kim et al., Oct. 27-29, 1999, IEEE, pp. 284-289.*

* cited by examiner

*Primary Examiner*—Donald Sparks
*Assistant Examiner*—Hashem Farrokh
(74) *Attorney, Agent, or Firm*—Sughrue Mion, PLLC

(57) ABSTRACT

A method for managing a flash memory is provided wherein logical addresses of data recorded in a data region of the flash memory are recorded in a corresponding spare region. An address mapping table is produced by scanning information recorded in the spare region. As a result, the flash memory can be embodied more effectively. In addition, it is possible to restore a mapping table even though the power is suddenly cut-off.

24 Claims, 5 Drawing Sheets

FLASH MEMORY MANAGEMENT METHOD

CROSS-REFERENCE TO RELATED APPLICATIONS

This application is based upon and claims priority from Korean Patent Application No. 2001-71401 filed Nov. 16, 2001, the contents of which are incorporated herein by reference.

BACKGROUND OF THE INVENTION

1. Field of the Invention

The present invention relates to flash memory, and more particularly, to a method for managing flash memory in a system based on flash memory.

2. Description of the Related Art

A flash memory is a non-volatile memory device for electrically deleting or rewriting data. A storage device based on a flash memory has lower power consumption and is smaller than a storage device based on magnetic disk memory. Thus, the flash memory has been researched as an alternative of the magnetic disk memory. More importantly, the flash memory is expected to be used as a storage device for mobile computing devices, such as a digital camera, a mobile phone, and a Personal Digital Assistant (PDA).

However, unlike magnetic disk memory which is capable of data overwriting, the flash memory cannot overwrite data. In order to overwrite data stored in the flash memory, existing data must be deleted first. In other words, memory cells should be returned to an initial writable state. Generally, deleting takes much longer time than writing. Furthermore, deleting is performed in a much larger block than that of writing, possibly causing the deletion of a portion of the existing data where writing is not requested to be deleted. Since a portion of the existing data that has been unintentionally deleted should be restored by rewriting, a request for writing data may require one deletion and rewriting some of the deleted portion. Writing capability remains considerably behind compared to the reading capability due to discordance) of the units for performing a deletion and writing. Further, writing capability is lower than that of a storage device based on a magnetic disk accompanying necessary delays due to mechanical operations.

Generally, a re-mapping method is used in managing the flash memory due to the above mentioned characteristics. The re-mapping method refers to a method of writing data to be corrected in empty addresses and updating mapping information of a mapping table, in other words, to a method of changing a physical address indicated by a requested logical address to a physical address to be recorded by corrected data. Accordingly, applications and application systems can access corrected data using one logical address.

FIG. 1 is a conceptual diagram illustrating a method for managing a conventional flash memory. Referring to FIG. 1, a logical address requested to read or write is changed into a physical address with reference to a mapping table and read/write data in corresponding addresses in the flash memory.

Here, there are various management methods depending on the locations of the existing mapping table and the method for referring to them. When the mapping table is positioned in a particular position of a flash memory, data can be maintained even though power is suddenly cut-off. As a result, there is no need to search for a method for restoring a mapping table. However, it is not easy to correct the mapping table. In other words, as described above, in the case of deleting, correcting, or rewriting data in performing operations in predetermined applications, large amounts of overhead calculations are required in order to update the mapping table.

In a case where the mapping table is positioned in a main memory (generally DRAM), it does not require a long period of time to access the main memory and it is easy to restore it, but data is lost, if the power is suddenly cut-off. In order to restore the mapping table, much time is required in performing complicated overhead calculations.

As described above, if re-mapping is adopted, space and time for storing and managing not only data but also mapping information are required. Accordingly, it is important to develop a method for handling a process of reading or writing data more efficiently. Furthermore, flash memory is limited in the number of partial writes in which the order of recording data, information, etc. has an effect on improving the capabilities of a system.

SUMMARY OF THE INVENTION

It is an object of the present invention to provide a method for managing flash memory of which capability is improved.

It is another object of the present invention to provide a method for conveniently producing a mapping table.

It is still another object of the present invention to provide a method for conveniently restoring a mapping table even though the power is suddenly cut-off.

To achieve the above objects, there is provided a method for managing a flash memory. Logical addresses of data recorded in a data region of the flash memory are recorded in a corresponding spare region. An address mapping table is produced by scanning information recorded in the spare region.

A produced address mapping table is recorded in a main memory or a produced address mapping table is recorded in the flash memory.

It is preferable that producing the address mapping table includes a step of producing the address mapping table by scanning logical addresses recorded in a particular spare region.

It is preferable that recording the logical addresses of data recorded in a data region of the flash memory in a corresponding spare region includes steps: recording time marks indicating orders of recording corresponding data in the spare region, and recording deletion marks indicating possibilities of using the corresponding data in the spare region.

To achieve above objects, there is provided a method for managing a flash memory. Writing-requested data is recorded in an empty address of a data region of the flash memory with reference to an address mapping table and corresponding logical addresses are recorded in corresponding spare regions. A correction table is updated so that physical addresses where the data is recorded are mapped to the logical addresses.

It is preferable that a deletion mark indicating the possibility of use of the recorded data is marked in spare regions corresponding to the physical addresses corresponding to the logical addresses with reference to the address mapping table.

To achieve the above objects, there is provided a method for managing a flash memory. Changes of an address mapping table stored in the flash memory containing mapping information of logical addresses and physical addresses are recorded in a correction table formed in a main memory. It is confirmed if the correction table is filled to a predetermined portion. If the predetermined portion of the correction table is filled, changes recorded in the correction table are reflected to the mapping table. The portions reflected to the mapping table of the contents recorded in the correction table are deleted.

BRIEF DESCRIPTION OF THE DRAWINGS

The above objects and advantages of the present invention will become more apparent by describing in detail the preferred embodiments thereof with reference to the attached drawings, in which.

DETAILED DESCRIPTION OF THE INVENTION

The present invention will now be described more fully with reference to the accompanying drawings, in which the preferred embodiments of the invention are shown.

Figure 1:
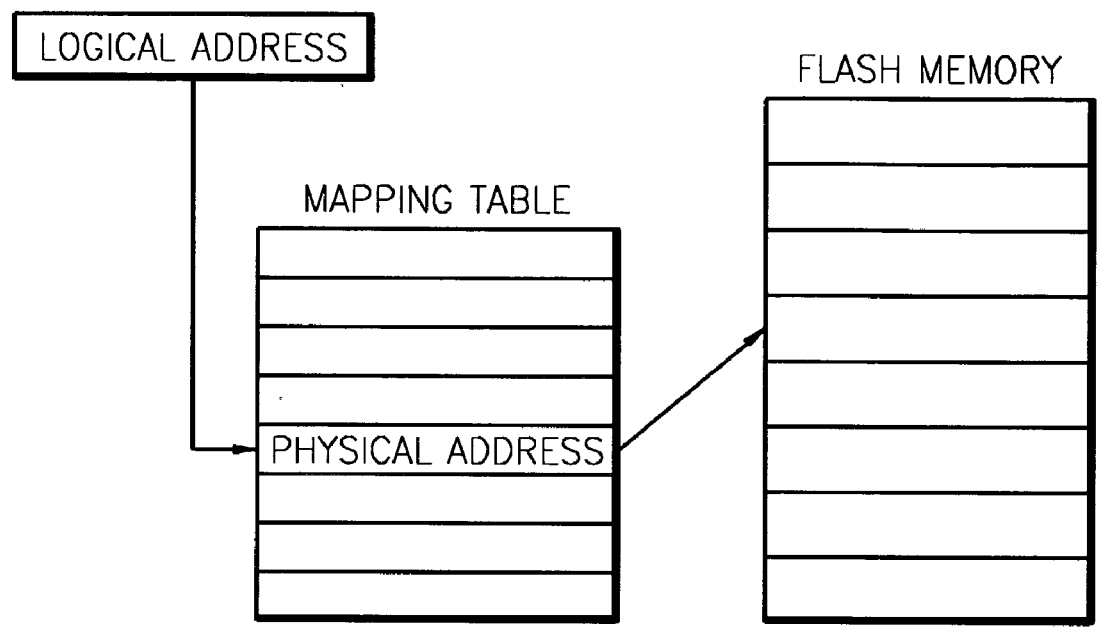
FIG. 1 is a conceptual view illustrated to describe a method for managing a conventional flash memory.
Figure 2:
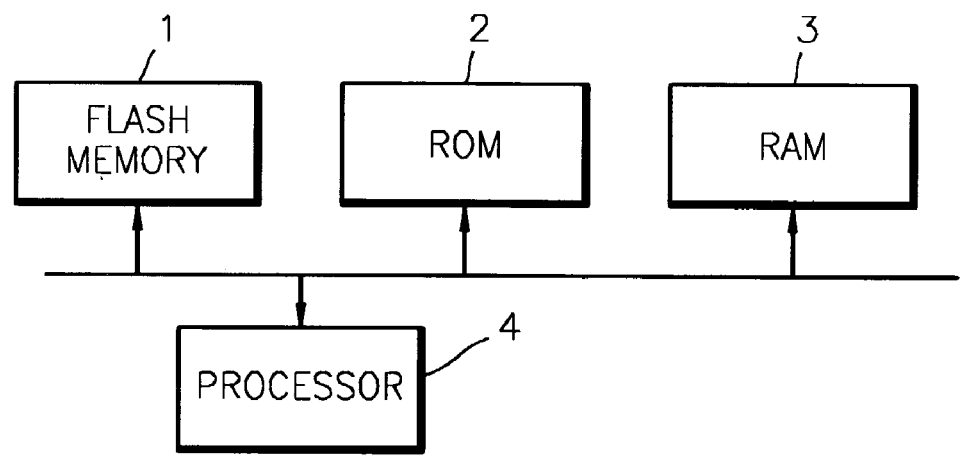
FIG. 2 is a block diagram of a flash memory system according to a preferred embodiment of the present invention.

FIG. 2 is a block diagram of a flash memory system according to a preferred embodiment of the present invention. Referring to FIG. 2, the system comprises a memory 1, a read only memory (ROM) 2, a random access memory (RAM) 3, and a processor 4. Here, the RAM 3, the main memory, is embodied as a dynamic random access memory (DRAM). However, if necessary, the RAM 3 may be embodied as a static random access memory (SRAM).

Generally, the processor 4 integrated with a program code recorded in the ROM 2 sends a series of write and deletion commands for the flash memory 1 or RAM 3. The flash memory 1 performs the write and deletion calculations according to the method for managing the flash memory of the present invention. The ROM 2 and the RAM 3 store an application code performed in the processor 4 or its related data structure.

Figure 3:
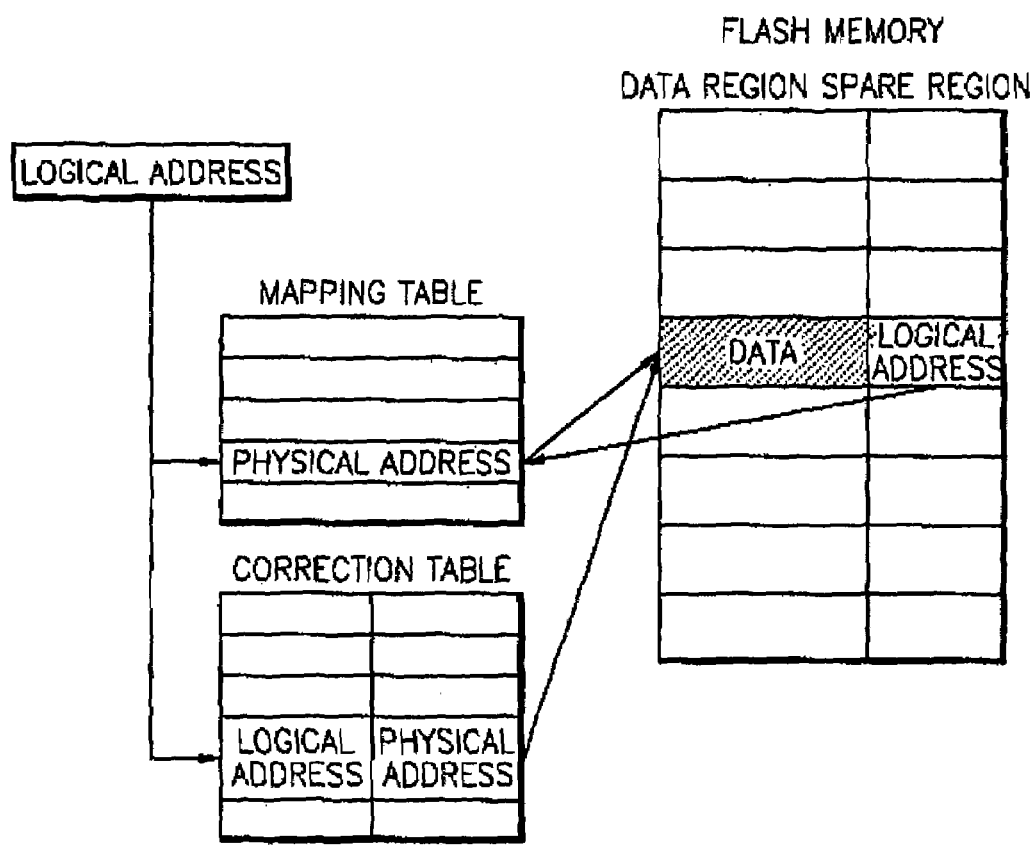
FIGS. 3 and 4 are detailed configuration views of a flash memory system according to the present invention.
Figure 4:
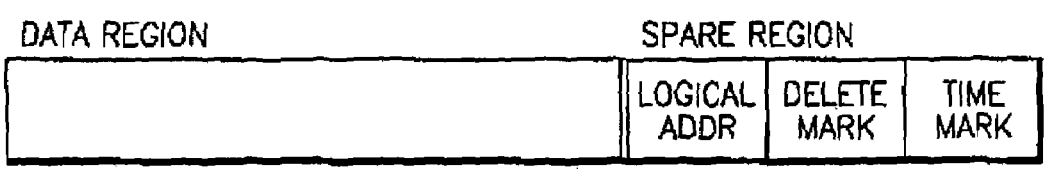

FIGS. 3 and 4 are detailed configuration views of a flash memory according to the present invention. Referring to FIGS. 3 and 4, the flash memory 1 is divided into a hardware data region and a spare region. The sectors of a data region and a spare region are formed to correspond to one another. Data is written in the data region, and logical addresses, time marks, and deletion marks are written in the corresponding spare region. The time mark indicates the time when corresponding data was written. The deletion mark indicates if the particular data is effective, in other words, the possibility of use, and the deletion mark shows that the contents in the particular sector is negligible and can be deleted even though the effective data is physically recorded in the sector. In other words, the deletion mark stands for a logical deletion.

In the first embodiment, a mapping table is positioned in the flash memory 1. The mapping table is produced by the processor 4 when a system is booted. The processor 4 produces a mapping table by scanning logical addresses, time marks, and deletion marks recorded in the spare region. The logical addresses and particular physical addresses are mapped in the mapping table. In addition, corresponding time marks and deletion marks are also recorded in the mapping table.

A correction table is positioned in the RAM 3. The correction table is for storing only changed contents of the mapping table in a case where data is newly recorded or already existing data is corrected when a predetermined application is performed. In other words, if the existing data recorded in the predetermined logical address is corrected, the processor 4 does not perform a deletion calculation, writes corrected data in empty sectors, and writes corresponding logical addresses and time marks in the corresponding spare regions. Accordingly, the correction table is mapped by a physical address of a sector where corrected data is recorded. It is possible to update mapping information quickly by separately placing a correction table in the RAM 3 without updating the mapping table positioned in the flash memory 1. In the meantime, the correction table has a fixed size. Accordingly, if all the regions in the correction table are used up, the processor 4 produces a new mapping table by reflecting changes recorded in the correction table to a mapping table positioned in the flash memory 1 and empties the correction table. When a particular portion of the correction table is filled, it is possible to adapt a method for reflecting the corrections to the mapping table and emptying only reflected portions of the correction table, if necessary. The mapping table is positioned in the RAM 3 and lost, if the power is cut-off.

A mapping table is positioned in the RAM 3 in the second embodiment. In this case, it is not necessary to additionally form correction tables. Because writing and deletion are easily performed in the RAM 3 unlike the flash memory 1. In other words, positioning the mapping table in the RAM 3 can be adopted if the RAM 3 has sufficient space due to sufficient system sources. In a case where data is newly written or existing data is corrected in the process that a predetermined application is performed, the processor 4 reflects changed contents by directly correcting the mapping table. However, if an additional correction table is further formed, it is managed with the same method as that in the first embodiment.

A process for booting a flash memory system and accessing the flash memory 1 will be described as follows.

<Booting>

When a system is booted, the processor 4 scans the entire spare region of the flash memory 1, produces a mapping table reflected by a current written state of the flash memory 1, and writes the mapping table in the flash memory 1 or the RAM 3. If more than two same logical addresses are found in the scanning process, new information is selected by comparing the existence of a deletion mark and a time mark. If old information is not marked with a deletion mark, a deletion mark is added.

<Accessing>

When accessing the flashing memory 1, the processor 4 searches a correction table to determine whether a corresponding logical address exists. If the corresponding logical address exists, the processor 4 finds a mapped physical address. If there is no particular logic address in the correction table, a physical address mapped to the corresponding logical address is found by searching the mapping address.

A method for managing a flash memory based on the above configuration will be described as follows.

Figure 5:
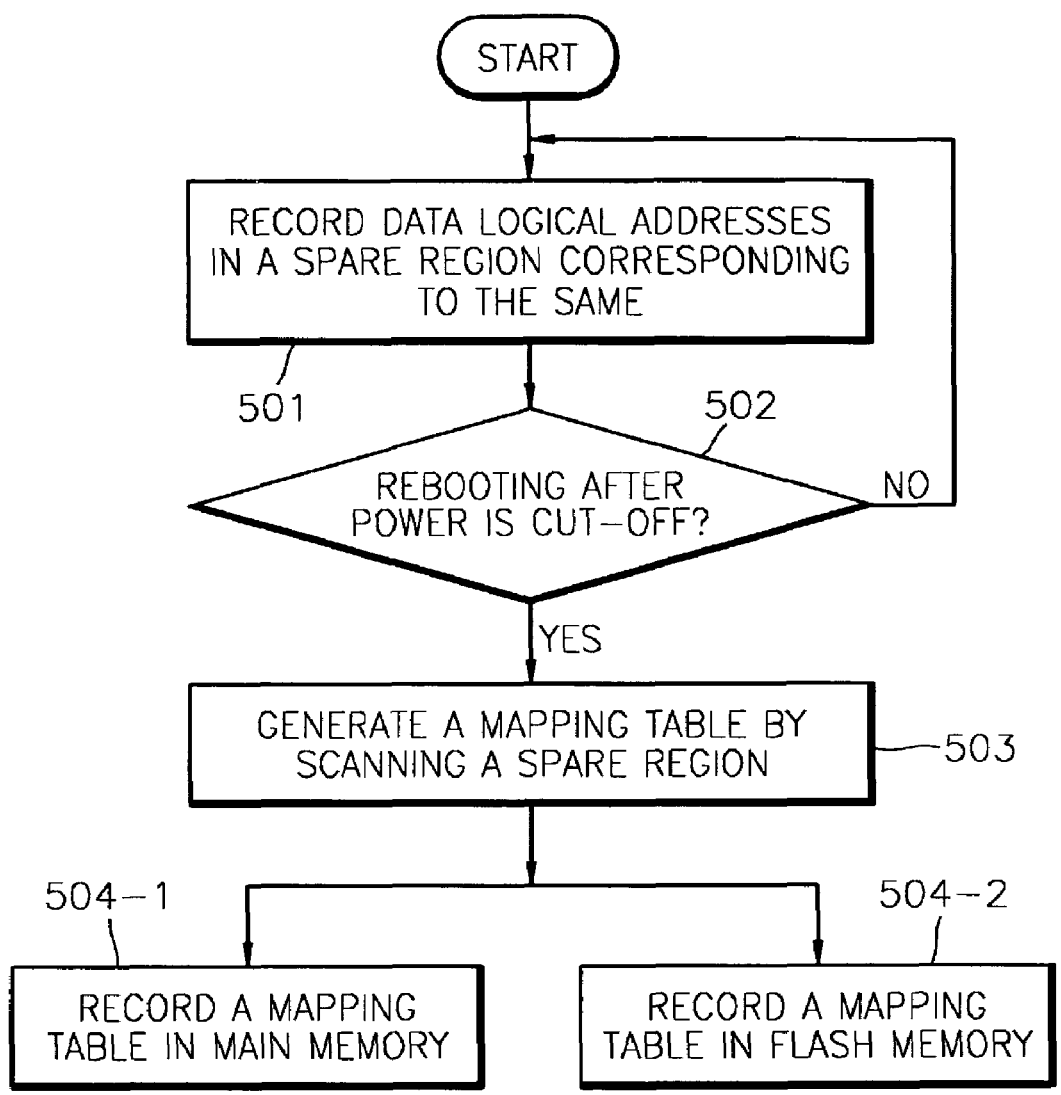
FIG. 5 is a flow chart illustrated to describe a method for managing flash memory according to an embodiment of the present invention.

FIG. 5 is a flow chart illustrated to describe a method for managing flash memory according to an embodiment of the present invention. Referring to FIG. 5, the processor 4 writes data in a data region of the flash memory 1 and writes the logical address of the written data in a corresponding spare region (step 501). Every time the data in the flash memory 1 is newly written or corrected, the step 501 is performed. If the power is cut-off and the system is rebooted (step 502), the processor 4 produces a mapping table by scanning the entire spare region (step 503). The processor 4 writes the produced mapping table in the RAM 3, which is a main memory (step 504-1), or writes the produced mapping table in the flash memory 1 (step 504-2).

Figure 6:
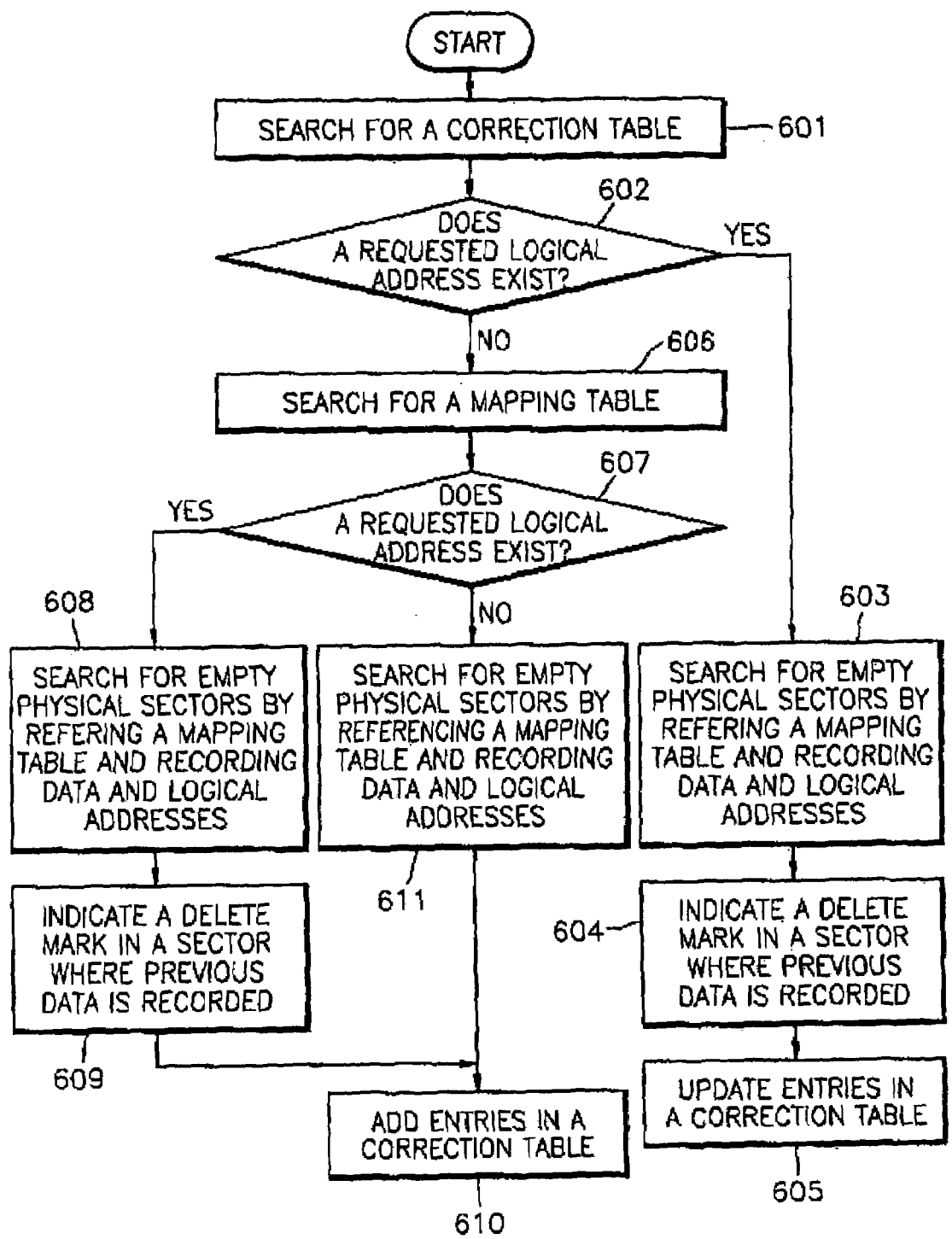
FIG. 6 is a flow chart illustrated to describe a method for managing flash memory according to another embodiment of the present invention.

FIG. 6 is a flow chart illustrated to describe a method for managing a flash memory according to another embodiment of the present invention. Referring to FIG. 6, if predetermined data is written in a requested logical address, the processor 4 searches for a correction table (step 601). If there exists a requested logical address (step 602), an empty sector is searched with reference to a mapping table, corresponding data is written in a data region, and its logical address is written in a corresponding spare region (step 603). Here, time marks are recorded together. Next, a deletion mark is recorded in a spare region of the sectors where the data is recorded with reference to the mapping table (step 604). Next, the existing entries written in the correction table are updated in order to be mapped to the physical addresses of the sector recorded in the step 603 (step 605).

In a case where a requested logical address does not exist (step 602), a mapping table is searched (step 606). If a requested logical address exists (step 607), empty sectors are searched with reference to the mapping table, corresponding data is recorded in a data region, and its logical address is written in a corresponding spare region (step 608). Here, time marks can be recorded together. In addition, deletion marks are recorded in a spare region of the sectors where the existing data is written with reference to the mapping table (step 609). Furthermore, new entries are added in the correction table so it is reflected that the step 608 was performed.

If a requested logical address does not exist in the mapping table (step 607), empty sectors are searched with reference to the mapping table, corresponding data is recorded in a data region, and its logical address is written in a corresponding spare region (step 611). Here, time marks can be recorded together. In addition, new entries are added in the correction table so it is reflected that the step 611 was performed (step 612).

Figure 7:
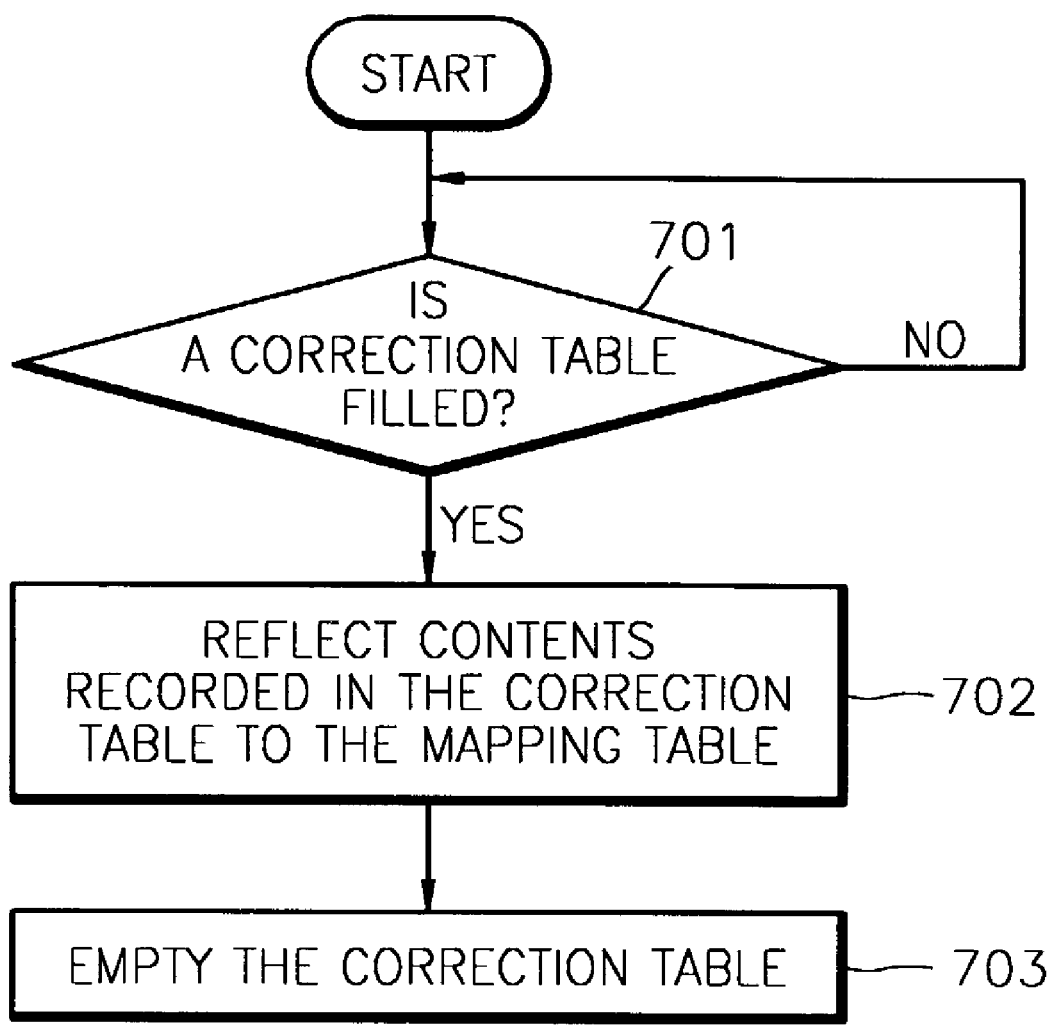
FIG. 7 is a flow chart illustrated to describe a process of updating a mapping table.

FIG. 7 is a flow chart illustrated to describe a process for updating the mapping table.

Referring to FIG. 7, if the correction table is filled (step 701), the processor 4 is influenced by the information of changes recorded in the correction table (step 702). In other words, the state of the mapping information recorded in the mapping table becomes the same as that of the currently recorded state in the flash memory 1. In the meantime, the processor 4 empties the correction table so that new entries may be recorded (step 703).

On the other hand, it is possible that the method for managing the flash memory is written by computer programs. It can be easily presumed that codes and code segments comprising the programs can be made by computer programmers skilled in the art. In addition, the programs are stored in computer readable medium, and read and run by computers, thus a method for managing the flash memory is embodied. Computer readable medium comprises a magnetic recording medium, an optical recording medium, and a carrier wave medium.

As described above, a flash memory can be more effectively accessed according to the present invention. It is possible to restore a mapping table even though the power is suddenly cut-off by recording logical addresses in a spare region. The spare region is formed to as a separate hardware from a data region, thus restoring a mapping table is performed more quickly than other scanning the spare regions. In addition, in a case when a mapping table exists in a flash memory, it is possible to save time and energy in updating the mapping table by forming a correction table in a main memory and recording changes in the correction table. Accordingly, system capabilities are improved.

What is claimed is:

1. A method for managing a flash memory, the method comprising:
    (a) recording logical addresses of data recorded in a data region of the flash memory in a corresponding spare region and recording deletion marks, which indicate possibilities of using the corresponding data, in the spare region;
    (b) producing an address mapping table by scanning information recorded in the spare region;
    (c) recording the address mapping table that is produced in the flash memory;
    (d) producing a correction table that indicates changes in the address mapping table; and
    (e) recording the correction table in a random access memory that is separate from the flash memory.

2. The method for managing a flash memory of claim 1, wherein the step (b) includes producing the address mapping table by scanning logical addresses recorded in a particular spare region.

3. The method for managing a flash memory of claim 1, wherein the step (a) includes recording time marks, which indicate orders of recording corresponding data, in the spare region.

4. The method for managing a flash memory of claim 1, further comprising:
    (f) determining whether a number of entries of the correction table that is recorded in the random access memory exceeds a predetermined threshold,
    wherein a new address mapping table is produced by scanning the information recorded in the spare region and the new address mapping table is recorded in the flash memory if the number of entries of the correction table is determined to exceed the predetermined threshold.

5. A method for managing a flash memory the method comprising:
    (a) recording logical addresses of data recorded in a data region of the flash memory in a corresponding spare region and recording time marks, which indicate orders of recording corresponding data, in the spare region; and
    (b) producing an address mapping table by scanning logical addresses and time marks of the data recorded in the spare region.

6. The method for managing a flash memory of claim 5, further comprising:
    (c) recording the address mapping table that is produced in the flash memory;
    (d) producing a correction table that indicates changes in the address mapping table; and
    (e) recording the correction table in a random access memory that is separate from the flash memory.

7. The method for managing a flash memory of claim 6, further comprising:
(f) determining whether a number of entries of the correction table that is recorded in the random access memory exceeds a predetermined threshold,
wherein a new address mapping table is produced by scanning the logical addresses and the time marks recorded in the spare region and the new address mapping table is recorded in the flash memory if the number of entries of the correction table is determined to exceed the predetermined threshold.

8. A method for managing a flash memory comprising:
(a) recording logical addresses of data recorded in a data region of the flash memory in a corresponding spare region, recording time marks, which indicate orders of recording corresponding data, in the spare region, and recording deletion marks, which indicate possibilities of using the corresponding data, in the spare region; and
(b) producing an address mapping table by scanning logical addresses, time marks and deletion marks of the data recorded in the spare region.

9. The method for managing a flash memory of claim 8, further comprising:
(c) recording the address mapping table that is produced in the flash memory;
(d) producing a correction table that indicates changes in the address mapping table; and
(e) recording the correction table in a random access memory that is separate from the flash memory.

10. The method for managing a flash memory of claim 9, further comprising:
(f) determining whether a number of entries of the correction table that is recorded in the main memory exceeds a predetermined threshold,
wherein a new address mapping table is produced by scanning the logical addresses and the time marks recorded in the spare region and the new address mapping table is recorded in the flash memory if the number of entries of the correction table is determined to exceed the predetermined threshold.

11. A method for managing a flash memory, the method comprising:
(a) recording logical addresses of data recorded in a data region of the flash memory in a corresponding spare region and recording deletion marks, which indicate possibilities of using the corresponding data, in the spare region;
(b) producing an address mapping table by scanning information recorded in the spare region when a system equipped with the flash memory is booted;
(c) recording the address mapping table that is produced in the flash memory;
(d) producing a correction table that indicates changes in the address mapping table; and
(e) recording the correction table in a random access memory that is separate from the flash memory.

12. The method for managing a flash memory of claim 11, further comprising:
(f) determining whether a number of entries of the correction table that is recorded in the random access memory exceeds a predetermined threshold,
wherein a new address mapping table is produced by scanning the logical addresses and the time marks recorded in the spare region and the new address mapping table is recorded in the flash memory if the number of entries of the correction table is determined to exceed the predetermined threshold.

13. A method for managing a flash memory, the method comprising:
(a) recording writing-requested data in an empty address of a data region of the flash memory with reference to an address mapping table, and recording corresponding logical addresses in corresponding spare regions; and
(b) updating a correction table, which is separate from the address mapping table, so that physical addresses where the writing-requested data is recorded in the step (a) are mapped to the logical addresses, the correction table storing only changed contents of the address mapping table.

14. The method for managing a flash memory of claim 13, wherein the step (a) includes recording time marks indicating an order of recording corresponding data in the spare region.

15. The method for managing a flash memory of claim 14, wherein step (a) includes recording deletion marks indicating a possibility of use of corresponding data in the spare region.

16. The method for managing a flash memory of claim 13, further comprising step (d) producing an address mapping table by scanning information recorded in the spare region.

17. A method for managing a flash memory the method comprising:
(a) recording writing-requested data in an empty address of a data region of the flash memory with reference to an address mapping table, and recording corresponding logical addresses in corresponding spare regions;
(b) updating a correction table, which is separate from the address mapping table, so that physical addresses where the writing-requested data is recorded in the step (a) are mapped to the logical addresses; and
(c) marking a deletion mark indicating the possibility of use of the data recorded in the step (a) in spare regions corresponding to the physical addresses corresponding to the logical addresses with reference to the address mapping table.

18. A method for managing a flash memory, the method comprising:
(a) recording writing-requested data in an empty address of a data region of the flash memory with reference to an address mapping table, and recording corresponding logical addresses in corresponding spare regions; and
(b) updating a correction table, which is separate from the address mapping table, so that physical addresses where the writing-requested data is recorded in the step (a) are mapped to the logical addresses when a system equipped with the flash memory is booted.

19. A method for managing a flash memory, the method comprising the steps of:
(a) recording changes of an address mapping table stored in the flash memory containing mapping information of logical addresses and physical addresses in a correction table formed in a main memory;
(b) confirming whether the correction table is filled to a predetermined portion;
(c) reflecting changes recorded in the correction table to the mapping table when it is confirmed that the predetermined portion of the correction table is filled; and
(d) deleting the portions reflected to the mapping table of the contents recorded in the correction table.

20. The method for managing a flash memory of claim 19, wherein the mapping table includes deletion marks indicating a possibility of use of corresponding data.

21. The method for managing a flash memory of claim 20, wherein the mapping table is recorded by time marks indicating an order of recording corresponding data.

22. The method for managing a flash memory of claim 19, wherein the correction table has a predetermined size.

23. The method for managing a flash memory of claim 22, wherein the correction table includes deletion marks indicating a possibility of use of corresponding data.

24. The method for managing a flash memory of claim 23, wherein the correction table includes time marks indicating an order of recording corresponding data.

* * * * *